United States Patent [19]

Bean et al.

[11] 4,224,619

[45] Sep. 23, 1980

[54] SYMBOLOGY WRITING APPARATUS FOR RADAR PLAN POSITION INDICATOR DISPLAYS

[75] Inventors: Donald E. Bean, Ruckersville; John R. Grymes, Jr., Orange; Reuben E. Maine, Charlottesville, all of Va.

[73] Assignee: Sperry Corporation, New York, N.Y.

[21] Appl. No.: 6,612

[22] Filed: Jan. 26, 1979

[51] Int. Cl.³ .............................................. G01S 7/22
[52] U.S. Cl. ............................................... 343/5 EM
[58] Field of Search .................................... 343/5 EM

[56] References Cited

U.S. PATENT DOCUMENTS

| | | | |
|---|---|---|---|
| 3,298,021 | 1/1967 | Jacobs et al. | 343/5 EM X |
| 3,579,234 | 5/1971 | Tsumura et al. | 343/5 EM |
| 4,126,858 | 11/1978 | Wiener | 343/5 EM |

Primary Examiner—T. H. Tubbesing
Attorney, Agent, or Firm—Howard P. Terry; Albert B. Cooper

[57] ABSTRACT

Symbology is written on a radar plan position indicator display with a rotating beam deflection field. The PPI radar range is quantized into range increments and digital data representative of the symbology to be written are inserted into a shift register which is clocked in synchronism with the range sweeps to provide interleaved digital data to the video input of the display. The normal radar video data is combined with the symbology data so that the symbology and normal radar returns are simultaneously written in real time. A portion of the symbology generating apparatus provides a manual acquisition marker comprising a range ring and an azimuth geometric figure. A range switch gates a clock pulse signal into a range up/down counter for incrementing and decrementing the number therein, the digital output of the counter being representative of the range of the range ring. The decoded digital output of the range counter is loaded into the shift register for bit serial application to the video input to the display. A manually operated azimuth switch similarly increments and decrements an azimuth counter, the digital output of which being compared to the radar antenna azimuth signal for positioning the azimuth geometric figure in azimuth. The symbology writing apparatus also includes a portion for providing alphanumeric or other localized symbology. These symbols are stored in a character table in the various orientations required for the plan position indicator display and written via the output shift register at azimuth and range coordinates provided by the system, the data therefor being interleaved with the data for the manual acquisition marker.

40 Claims, 7 Drawing Figures

SYMBOLOGY WRITING APPARATUS FOR RADAR PLAN POSITION INDICATOR DISPLAYS

BACKGROUND OF THE INVENTION

1. Field of the Invention

The invention relates to plan position indicator displays, commonly denoted as PPI, particularly with regard to radar PPI display systems utilized on marine surface vessels.

2. Description of the Prior Art

Radar systems utilizing PPI displays are currently prevalent for use on marine surface vessels for the detection of other ships which may present collision threats and for the display of the radar returns from such ships so as to provide the range and azimuth of the detected target ships with respect to the position of own ship. Such PPI indicators utilize cathode ray tubes with rotating beam deflection fields provided generally by either rotating deflection yokes synchronized with the rotating antenna or by fixed deflection yokes or plates provided with a rotating beam deflection signal generated by electronically resolving the radar antenna rotation. Such systems are discussed on pages 26–28 of Volume 22 of the MIT Radiation Laboratory Series entitled "Cathode Ray Tube Displays", published by the McGraw-Hill Book Company, Inc. in 1948.

Such radar PPI displays are often utilized in systems for providing collision threat assessment data with respect to detected objects such as ships, boats, navigational markers, fixed and floating platforms, etc. commonly referred to as targets. It is often necessary in such systems to manually acquire the individual targets by providing the current range and azimuth coordinates of the target to the system so that thereafter the designated target can be tracked. Manual acquisition markers have been generated that are positionable over the face of the display via manually operated controls whereby positioning the marker over a target permits entry of the target coordinate data into the system. In order to write such manual acquisition markers on the PPI displays it has been necessary to provide dual beam deflection systems whereby the normal radar returns are written by one such system and the manual acquisition marker written by the other. Such dual deflection arrangements not only increase the complexity and hence the cost of the systems, but also present a registration or alignment problem whereby alignment between the separately written symbology is not readily achievable. Such dual deflection system also present undesirable timing problems in that the additional symbology must be written during the interscan intervals of the normal radar presentation. These problems are particularly severe in rotating yoke PPI displays in which the real time azimuth reference data is only available at a particular azimuth once during each rotation of the antenna and the synchronized deflection yoke. Thus in typical systems this required azimuth data may only become available once every three seconds for a 20 RPM antenna, for example.

It is also desirable in such systems to write alphanumeric characters as well as other localized symbology on the PPI display to provide information with respect to, for example, the collision threat assessment function. It may, for example, be desirable to associate identifying alphanumeric characters with acquired targets and to display projected course lines or past target history indicia on the PPI. All of the difficulties discussed above in displaying a manual acquisition marker on PPI systems are attendant the display of alphanumeric characters and other localized symbology. Generally in the prior art separate deflection systems have been required to display such data.

Complex and expensive full capability collision avoidance systems have been provided in the prior art which display radar target returns, alphanumeric symbology and manual acquisition markers but provide these functions by such complex techniques as dual deflection systems as discussed above. Additionally, radar PPI systems are available which are particularly adaptable for the inclusion of less complex and hence less expensive collision threat assessment apparatus which would be attached to the especially adapted radar PPI system to provide the enhanced threat assessment capability. The prior art also includes the possibility of internally altering existing basic radar PPI systems so as to be adaptable to the addition of collision threat assessment provisions.

It is believed that prior to the present invention simplified and relatively inexpensive collision threat assessment apparatus did not exist that could be simply connected to existing basic radar PPI indicators without modification to the basic radar system or display. The present invention is utilized to provide the primary display functions in a relatively inexpensive anticollision device for marine surface vessels which can be readily added to most existing basic radar PPI indicator systems.

SUMMARY OF THE INVENTION

The above disadvantages of prior art radar PPI display systems are obviated by generating the data for intensifying the cathode ray tube beam at quantized ranges along the range sweep of the PPI in accordance with the symbology that it is desired to display and by serially applying this data to the video input of the display in synchronism with the range sweep. The symbology data may be combined with the radar video signal so as to display the desired symbology in radar real time as the rotating range sweeps provide the normal radar display. Various types of symbology may in this manner be displayed by combining and interleaving the data therefor providing an integrated display where the eye of the viewer distinguishes the various symbology.

In one species of the invention a manual acquisition marker is generated comprising a range ring that may be slewed in range and an azimuth geometric figure that may be slewed in azimuth so as to manually position the azimuth geometric figure over a target for acquisition purposes.

Another species of the invention comprises apparatus for writing alphanumeric and other characters on the PPI display. The characters are stored in various orientations so as to provide reasonably upright display presentation in the sectors comprising the display face.

In accordance with the invention, the range quantized data for the manual acquisition marker and for the alphanumeric and other localized characters are combined and interleaved whereby for each range sweep all of the symbology at the azimuth through which the range sweep passes is written in real time as the sweep is generated. The normal radar target returns may also be combined with the symbology data so as to be written therewith.

DESCRIPTION OF THE PREFERRED EMBODIMENTS

The present invention comprises apparatus for writing symbology on the face of a radar PPI display in radar real time where the PPI may utilize a rotating or a fixed yoke. The successive range sweeps write all of the symbology and normal radar data in real time in interleaved fashion as the sweeps are generated. Two preferred species of the invention concern apparatus for generating and displaying a manual acquisition marker and localized characters such as alphanumeric symbology, respectively.

Figure 1:
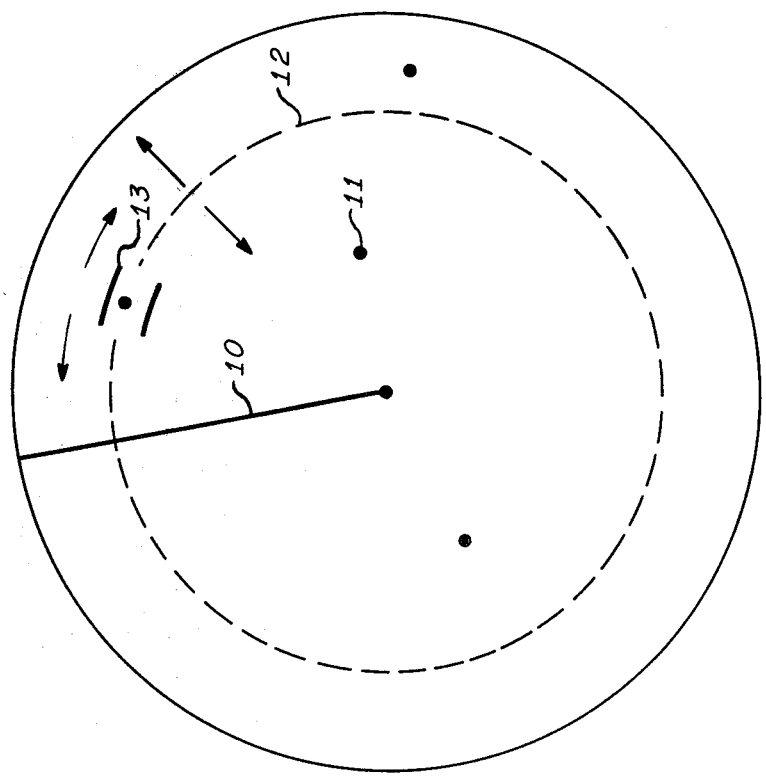
FIG. 1 is a view of the PPI display of the present invention illustrating the manual acquisition marker comprising a range ring and an azimuth geometric figure.

Referring to FIG. 1, a view of the PPI display face showing the manual acquisition symbol as well as several radar returns from targets is illustrated. As is well known, a range sweep 10 is rotated about the range origin in synchronism with the azimuthal scanning of the antenna. Targets, such as a target 11, then appear in the proper azimuthal directions as well as at the proper ranges from the origin resulting in a map of the targets in the area. It is appreciated that the rotating range sweep 10 may be generated in a conventional manner either by a rotating deflection yoke or by a fixed yoke with resolved azimuth signals from the rotating antenna applied thereto as discussed in the aforementioned Volume 22 of the MIT Radiation Laboratory series.

In accordance with one preferred species of the invention, a manual acquisition marker comprising a range ring 12 and an azimuthal geometric figure 13 are illustrated. The range marker ring 12 may be solid, dotted or otherwise coded to distinguish it from conventional circular range cursors, if present. In the preferred embodiment of the invention the range marker ring 12 is generated in dashed line fashion. The diameter of the range marker ring 12 may be increased or decreased by manipulation of a range switch by an operator in a manner to be later described.

The azimuthal geometric figure 13, which in the preferred embodiment is in the form of a box, is centered on the range marker 12 and is positionable in azimuth by the system operator by means of an azimuth switch in a manner to be later described. The azimuth box or window 13 is comprised of two arcuate segments, one above and one below the range ring 12, the area therebetween representing the selected operator designated area. When the geometric designator figure 13 is centered on a point of the display, this center represents the range and bearing of that selected point on the PPI screen. Thus when the operator positions the range ring 12 to coincide with the range of a radar target and positions the azimuth window 13 so as to be centered on the target, the range and bearing of the target may then be entered into the system for acquisition and tracking purposes in a manner to be described.

Figure 2:
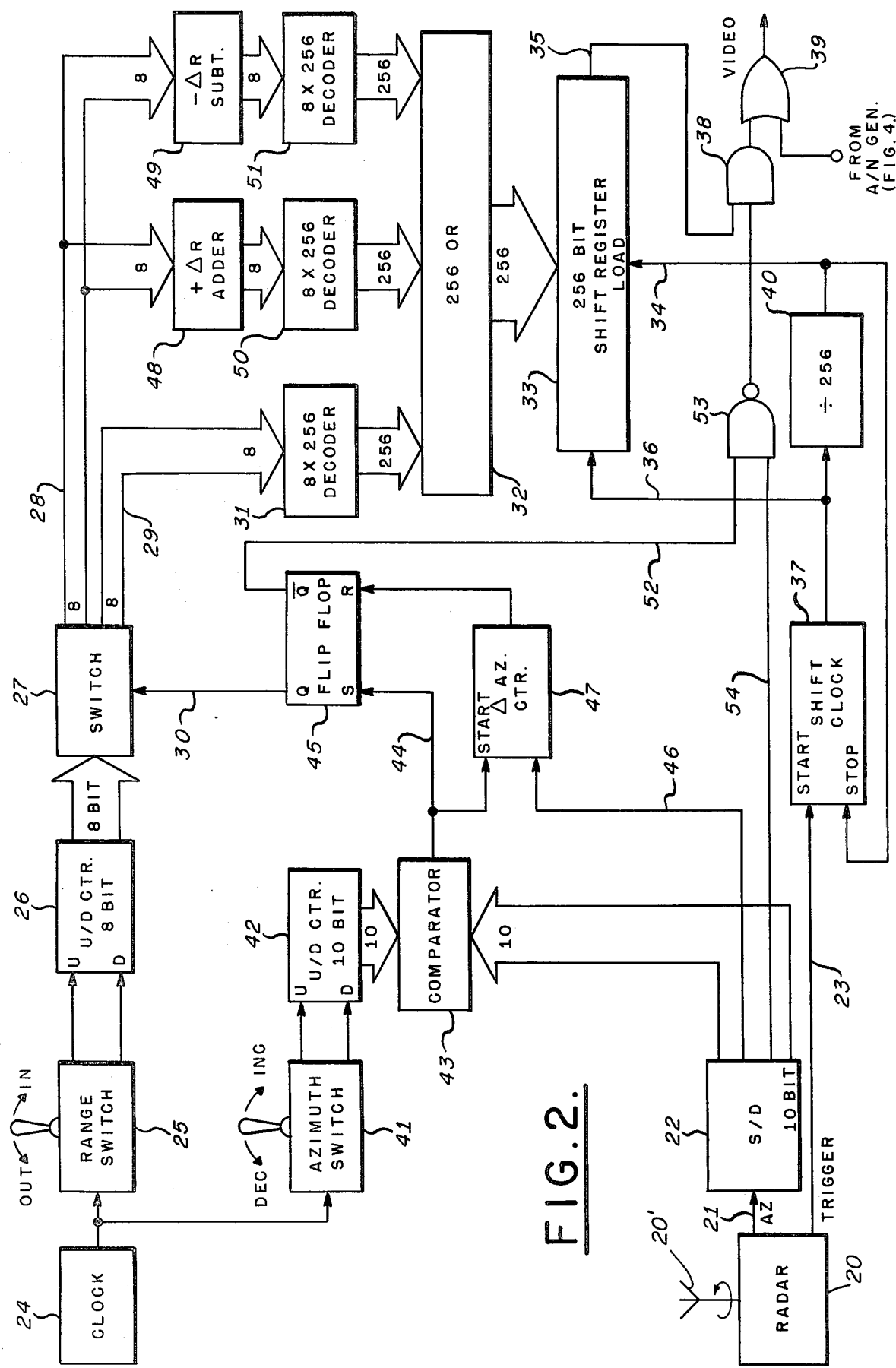
FIG. 2 is a schematic block diagram of apparatus for generating the manual acquisition marker of FIG. 1 in accordance with the invention.

Referring to FIG. 2, apparatus for generating and displaying the manual acquisition marker depicted in FIG. 1 in radar real time is illustrated. The conventional portions of the radar are indicated at 20 which include, for example, the rotating radar antenna 20 as well as the electronic circuitry for providing the radar transmissions as the antenna rotates. The radar 20 also includes conventional circuitry for receiving and processing the radar returns. The radar system 20 provides an azimuth signal on leads 21 which may, for example, be generated by a synchro device coupled to the rotating antenna. The azimuth signal from the radar antenna is applied to a conventional synchro-to-digital converter 22 which in turn provides a digital number representative of the azimuthal position of the antenna. The 360 degress of azimuth are, for convenience, quantized into 1,024 incremental azimuth sectors, the converter 22 providing a concomitant resolution of 10 bits. The radar system 20 also provides a radar trigger signal on a lead 23 which coincides with the transmissions of the radar pulses. The radar triggers on the lead 23 are utilized in a conventional manner to trigger the range sweeps for the PPI display.

The apparatus of FIG. 2 includes a clock pulse generator 24 that provides a clock pulse signal of relatively low frequency commensurate with the slewing rates of the range marker ring 12 and acquisition window 13 discussed with respect to FIG. 1. The clock pulse signal from the generator 24 is applied to a range switch 25 which gates the clock pulse signal into the up and down inputs of a range up/down counter 26. The range switch 25 functions as a single pole, double throw switch that directs the clock pulse signal to the up and down inputs to the counter 26 when the switch is moved to the OUT and IN switch positions respectively. When the switch is in its central position, no input if provided to the counter 26. Thus when the operator actuates the range switch 25 to the IN position, the clock pulse signal from the generator 24 is applied to the down input of the counter 26 and the counter counts downwardly. Similarly, when the operator actuates the range switch to the OUT position, the clock pulse signal is directed to the up input of the counter 26 and the counter counts upwardly.

In a manner to be clarified, the digital output of the counter 26 is representative of the range at which the range ring 12 (FIG. 1) will be drawn. The range of the PPI display from the range center as illustrated in FIG. 1 to the end of the range sweep is quantized for convenience into 256 range bins. Thus the counter 26 may specifically comprise an eight bit counter to represent the 256 quantized range bins.

The eight bit parallel output from the counter 26 is applied to a switch 27 which selectively connects the output of the counter 26 either to leads 28 or to leads 29 in accordance with a binary control input on a lead 30.

When the control input 30 is in one binary state, the output from the counter 26 is directed to the leads 28. When the control input 30 is in the other binary state, the output of the counter 26 is directed to the leads 29. The outputs 28 from the switch 27 are utilized, in a manner to be later described, to generate the azimuth box 13 and the outputs 29 of the switch 27 are utilized in generating the range ring 12.

The eight bit parallel output 29 from the switch 27 is applied to an 8 line to 256 line decoder 31. In a conventional manner, the decoder 31 enables one of the 256 output leads thereof in accordance with the eight bit binary number on the leads 29. The 256 outputs of the decoder 31 are applied as inputs to 256 OR gates 32, respectively. Thus the first of the 256 output leads from the decoder 31 provides one input to the first of the OR gates 32. The second of the 256 outputs from the decoder 31 provides an input of the second of the OR gates 32. In a similar manner, each of the 256 outputs from the decoder 31 provides one input to one of the OR gates 32.

The 256 respective outputs from the 256 OR gate 32 are applied in parallel to the respective 256 stages of a 256 bit shift register 33, the 256 stages of the shift register 33 correspond respectively to the 256 range bins into which the range sweep 10 (FIG. 1) is quantized. The register 33 is loaded in parallel in response to a signal on a lead 34 and the contents of the register 33 are shifted out serially onto a lead 35 in response to a shift clock signal on a lead 36. The shift clock signal for the register 33 is provided by a shift clock generator 37. The bit serial output on the lead 35 is applied through an AND gate 38 and an OR gate 39 to provide a video signal to the intensification input of the cathode ray tube of the PPI display. In a manner to be described, the shift clock 37 is started in synchronism with the start of a range sweep and the frequency of the clock signal from the shift clock generator 37 is selected such that the shift register 33 outputs the content of the shift register stage corresponding to the range bin being traversed by the cathode ray tube beam as it executes the range sweep. A binary ONE provided on the lead 35 unblanks the beam and causes the beam to write at the associated range bin of the range sweep. A binary ZERO on the lead 35 causes beam blanking resulting in the beam traversing the associated range bin without writing. Thus it is appreciated that for a particular range sweep and a particular 256 bit word loaded into the register 33, the range bins of the sweep corresponding to those stages of the register 33 storing binary ONEs will be intensified during the sweep as the 256 bit contents of the register 33 are serially applied to the lead 35 in synchronism with the range sweep.

The eight bit word from the counter 26, which represents the range at which the range ring 12 (FIG. 1) is to be written, when applied through the switch 27 and the leads 29 to the decoder 31 causes energization of the decoder output lead corresponding to the value of the eight bit binary number. This signal through the corresponding one of the OR gates 32 inserts a binary ONE into the corresponding stage of the shift register 33, thus resulting in intensification of the cathode ray tube beam as it sweeps through the range bin corresponding to the value of the eight bit number in the counter 26. When the number in the counter 26 is slewed upwardly or downwardly by manipulation of the range switch 25, the range ring 12 is correspondingly slewed outwardly and inwardly in range. When the range switch 25 is returned to its central position thus terminating the input of clock pulses to the counter 26, the number in the counter 26 remains at its then existing value controlling the generation of the range ring 12 at the corresponding range.

Synchronism between the generation of the range sweep by the cathode ray tube beam and the shifting out of the contents of the shift register 33 is achieved by starting the shift clock 37 with the radar trigger on the lead 23. The output from the shift clock 37 is applied to the register 33 via the lead 36 to provide the synchronous shifting. The output of the shift clock 37 is also applied to a divide by 256 counter 40 which provides an output pulse after counting 256 of the shift clock pulses. The output of the counter 40 is utilized to stop the shift clock 37 and to load the next 256 bit word into the register 33 via the lead 34. Thus it is appreciated that when the radar trigger starts a range sweep it simultaneously starts the shifting of the register 33 which is terminated after the 256 bit contents thereof are serially shifted onto the line 35 to provide the video signal for intensifying the beam as the range sweep is generated.

The manner in which the apparatus of FIG. 2 generates the acquisition window 13 of FIG. 1 and provides the dashed line coding for the range ring 12 will now be explained. The slow clock pulse signal from the clock pulse generator 24 is applied through an azimuth switch 41 to the up input and the down input of an up/down azimuth counter 42. When the azimuth switch 41 is activated to its INCREASE position, the clock pulse signal is applied to the up input of the counter 42 and when the switch 41 is actuated to the DECREASE position, the clock pulses are applied to the down input of the counter 42. When the switch 41 is in its central position, clock pulses are not applied to the counter 42. Thus in a manner similar to that described above with respect to the counter 26 and the range switch 25, when the azimuth switch 41 is actuated by the operator to the INCREASE position the number in the counter 42 increases. When the azimuth switch 41 is positioned to the DECREASE position, the number in the counter 42 is decreased. When the azimuth switch 41 is in its central position, the number in the counter 42 does not change.

As previously explained, the 360 degrees of azimuth on the display is quantized into 1,024 azimuth increments which are representable by a ten bit binary number. The ten bit number resident in the counter 42 designates the incremental azimuth position at which it is desired to begin writing the azimuth window 13. Thus by operating the azimuth switch 41, the azimuth window 13 may be positioned in azimuth by the operator.

As previously described, the synchro-to-digital converter 22 provides a ten bit binary number respresentative of the current azimuthal position of the radar antenna. This number is compared in a comparator 43 with the output of the counter 42 and when comparison is achieved, the comparator 43 provides a signal on a lead 44. The output of the comparator on the lead 44 sets a flip-flop 45 and starts a Δ azimuth counter 47. The Δ azimuth counter 47 provides the length of the azimuth window 13. The clock input signal is provided by a selected bit output 46 of the synchro-to-digital converter 22. The configuration of the counter 47 is selected such that the counter will overflow in the time required for the rotating range sweep to rotate through the angle subtended by the azimuth window 13. The overflow signal from the Δ azimuth counter 47 is utilized to reset the flip-flop 45.

When the flip-flop 45 is in its set state, the switch 27 directs the eight bit range number from the counter 26 to the leads 28 and the display generates the azimuth window 13. When the flip-flop 45 is in the reset state, the switch 27 directs the eight bit range number from the counter 26 to the leads 28, and the display generates the range ring 12.

The generation of the azimuth window 13 will now be explained. With the flip-flop 45 in the set state, the switch 27 connects the eight bit range output from the counter 26 to the leads 28. A (+ΔR) adder 48 adds a range increment ΔR to the range number from the counter 26 and a (−ΔR) subtracter 49 subtracts a like quantity ΔR from the range number. The eight bit incremented and decremented numbers from the adders 48 and 49 are applied respectively to 8 line to 256 line decoders 50 and 51 respectively. Each of the decoders 50 and 51 operates in a manner similar to that described above with respect to the decoder 31 to energize one of the 256 output leads thereof in accordance with the eight bit number applied thereto. The 256 output leads from the decoder 50 are applied respectively as the second inputs to the respective 256 three input OR gates 32, the first inputs to the three input OR gates 32 being provided respectively from the 256 outputs of the decoder 31 as previously described. In a similar manner, the third inputs to the 256 OR gates 32 are provided respectively by the 256 outputs of the decoder 51.

When the azimuth window 13 is being generated and the flip-flop 45 controls the switch 27 to provide the range number to the leads 28, the switch 27 simultaneously applies binary ZERO to the leads 29. Thus when the rotating range sweeps traverse the azimuth sector in which the azimuth window is to be drawn, the incremented and decremented range numbers provided by the adder 48 and the subtractor 49 result in inserting binary ONEs into the shift register 33 in range bins that are respectively greater and less by ΔR than the range at which the range ring 12 is being written. It is therefore appreciated that when the contents of the shift register 33 are serially provided to the lead 35 at the time that the azimuth window 13 is being generated, the two arcuate segments illustrated in FIG. 1 are written.

As previously described, the range acquisition ring 12 is written with a dashed line to distinguish the ring from the conventional radar range markers. As is evident from FIG. 1, the dashed line presentation is applied only at the azimuth positions at which the acquisition box 13 is not being written. When the range sweep 10 rotates through the azimuth sector in which the acquisition box 13 is to be written, it is preferable to draw solid lines for this portion of the manual acquisition symbol. The dashed range ring 12 is provided in the following manner.

When the range sweeps 10 are writing the range ring 12, the flip-flop 45 is in the reset state thus providing an enabling signal on a line 52 to a NAND gate 53. The second input to the NAND gate 53 is provided by one of the bit outputs 54 of the ten bit output of the synchro-to-digital converter 22 in accordance with the resolution of the dashed desired. As previously described, the synchro-to-digital converter 22 provides a continuously varying ten bit parallel digital number representative of the azimuthal position of the rotating radar antenna. As is well known, each of the ten bit outputs of the converter 22 comprises a square wave having a frequency in accordance with the bit significance. Thus the bit output 54 selected to provide the dashed line for the range ring 12 alternately enables and disables the NAND gate 53 at the frequency of the square wave. Accordingly, the output of the NAND gate 53 which is applied as an input to the AND gate 38 alternately enables and disables AND gate 38 thus alternately transmitting and blocking the serial output from the shift register 33 on the line 35. The resulting video signal through the OR gate 39 thus provides alternate sectors of intensification and blanking which provides the desired dashed line effect.

When the range sweep 10 is rotating through the azimuth sector in which the acquisition window 13 is being drawn, the flip-flop 45 is in the set state thereby applying a disabling signal on the line 52 which disables the NAND gate 53. When the NAND gate 53 is disabled, the output provided thereby to the AND gate 38 is a continuous enabling signal thus permitting the digital video on the line 35 to pass therethrough without the alternating blanking effect previously described.

As explained above, the system of the present invention interleaves a variety of symbology during each range sweep to provide an integrated display. Digital video signals for writing symbology other than the manual acquisition marker described is applied as an input to the OR gate 39 so that the combined digital video is applied to the intensification input of the cathode ray tube of the PPI.

In the operation of the apparatus of FIG. 2 in generating the range marker ring 12 and acquisition window 13, the operator slews the range ring 12 in or out by means of the range switch 25 and slews the acquisition window 13 in azimuth by means of the azimuth switch 41 until the acquisition window 13 is centered over a radar target. When this occurs, the eight bit digital number in the range counter 26 and the ten bit digital number in the azimuth counter 42 provide the range and azimuth coordinates of the acquired target. Outputs (not shown) from these counters provide the target coordinate data to the system for track while scan purposes, for example.

In summary of the operation of FIG. 2, it is appreciated that as the range sweep 10 rotates through the azimuth locations at which the dashed ring 12 is written, the eight bit number in the range counter 26 is directed through the switch 27 to the leads 29 and is decoded in the decoder 31 to provide an intensification signal in the appropriate one of the 256 range bins. For each range sweep the 256 bits representing the beam intensification in the corresponding 256 range bins are loaded into the shift register 33 and are serially shifted to provide the video signal from the OR gate 39 in synchronism with the range sweep on the PPI display. The dashed coding of the range ring 12 is provided by utilizing one of the lower significant outputs of the synchro-to-digital converter 22 to, in effect, chop the video to provide the dashed line effect. When the radar antenna reaches the azimuth at which the writing of the acquisition window 13 is to commence (as designated by the binary number in the azimuth counter 42) the output of the synchro-to-digital converter 22 provides comparison with the binary number in the counter 42 and the comparator 43 sets the flip-flop 45 which in turn controls the switch 27 to direct the range number from the counter 26 to the leads 28. When the range sweep 10 is rotating through the azimuth sector in which the acquisition window 13 is to be written, the adders 48 and 49 increment and decrement the range number from the counter 26 by ΔR thereby providing the video signals in the appropriate range bins to draw the two arcuate segments comprising the acquisition window 13. The Δ azimuth counter 47 which was started by the comparator 43 determines the azimuth dimension of the window.

The present invention provides apparatus for writing a variety of symbology on, for example, a rotating yoke PPI display in real time concurrently with the real time radar returns. As well as providing the above described apparatus for displaying the manual designation marker 12 and 13 of FIG. 1, the present invention also provides the capability of simultaneously writing alphanumeric characters and like symbology.

Figure 3:
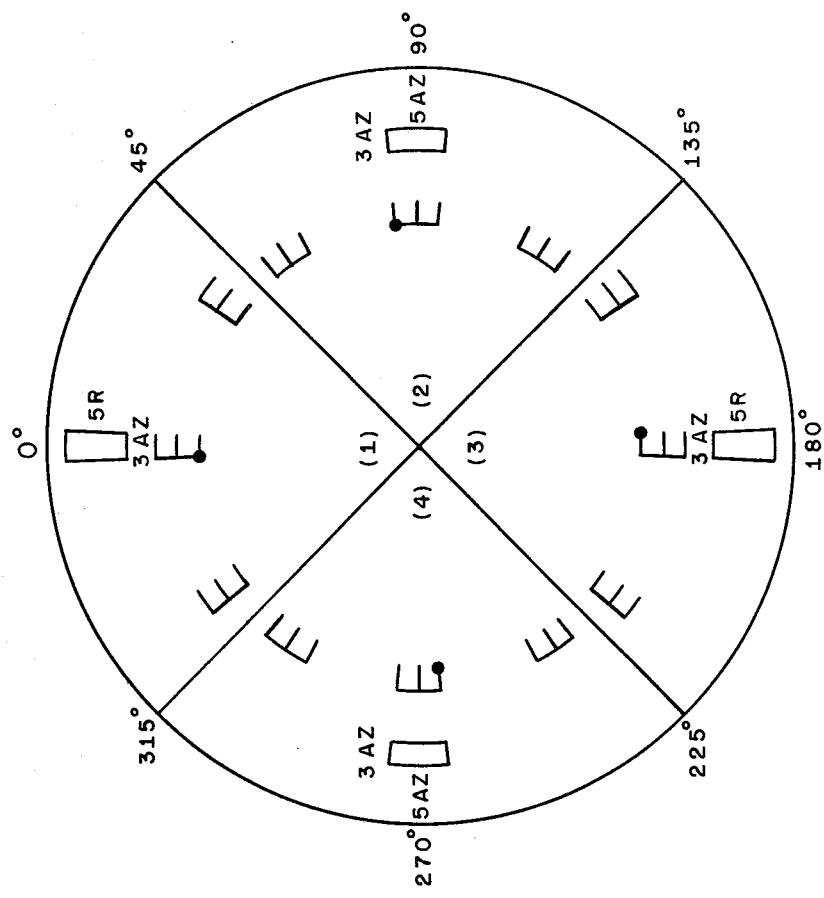
FIG. 3 is a graph of the PPI display illustrating characteristics useful in explaining the species of the invention illustrated in FIG. 4.

Referring to FIG. 3, a chart of the display face of the PPI depicting various characteristics thereof with respect to the alphanumeric symbology presentation is illustrated. For purposes of writing alphanumeric characters in a conveniently readable orientation, the display may be considered as divided into, for example, four sectors designated as quadrants (1), (2), (3), and (4). It is appreciated that other numbers of sectors may be utilized to the same effect in practicing the invention. Although the invention is not limited to the arrangement, the preferred embodiments are illustrated and described having the radar range center coincident with the center of the PPI display with zero degrees at the top of the screen. Accordingly, each quadrant comprises a 90 degree azimuth sector with boundaries of 45 degrees, 135 degrees, 225 degrees and 315 degrees as indicated by the legends. In accordance with one aspect of the invention, four complete sets of symbols and characters to be displayed are stored and written in a manner to be described for the four respective quadrants of the display. The alphabetic character "E" is illustrated as it would appear on the display in the four quadrants thereof. For readability and convenience the characters and symbols written in quadrants (1) and (3) are three incremental azimuth sectors wide and five range bins high whereas the characters and symbols written in quadrants (2) and (4) are three range bins wide and five incremental azimuth sectors high. In a manner to be later described, the size of the characters and symbols are increased when displayed at a range less than a minimum range so as to maintain reasonable uniformity and readability of the symbology over the entire face of the PPI display. A box illustrating the above delineated character and symbol dimensions is illustrated in each of the quadrants of FIG. 3.

In displaying the characters and symbols it is convenient to provide a starting point therefor for comparison with range and azimuth coordinate data provided by the system. The starting point for the illustrated symbol "E" in each of the four quadrants is indicated by a dot associated with the symbol. The coordinates for the starting point are designated as $(AZ_1, R_1)$.

Figure 4:
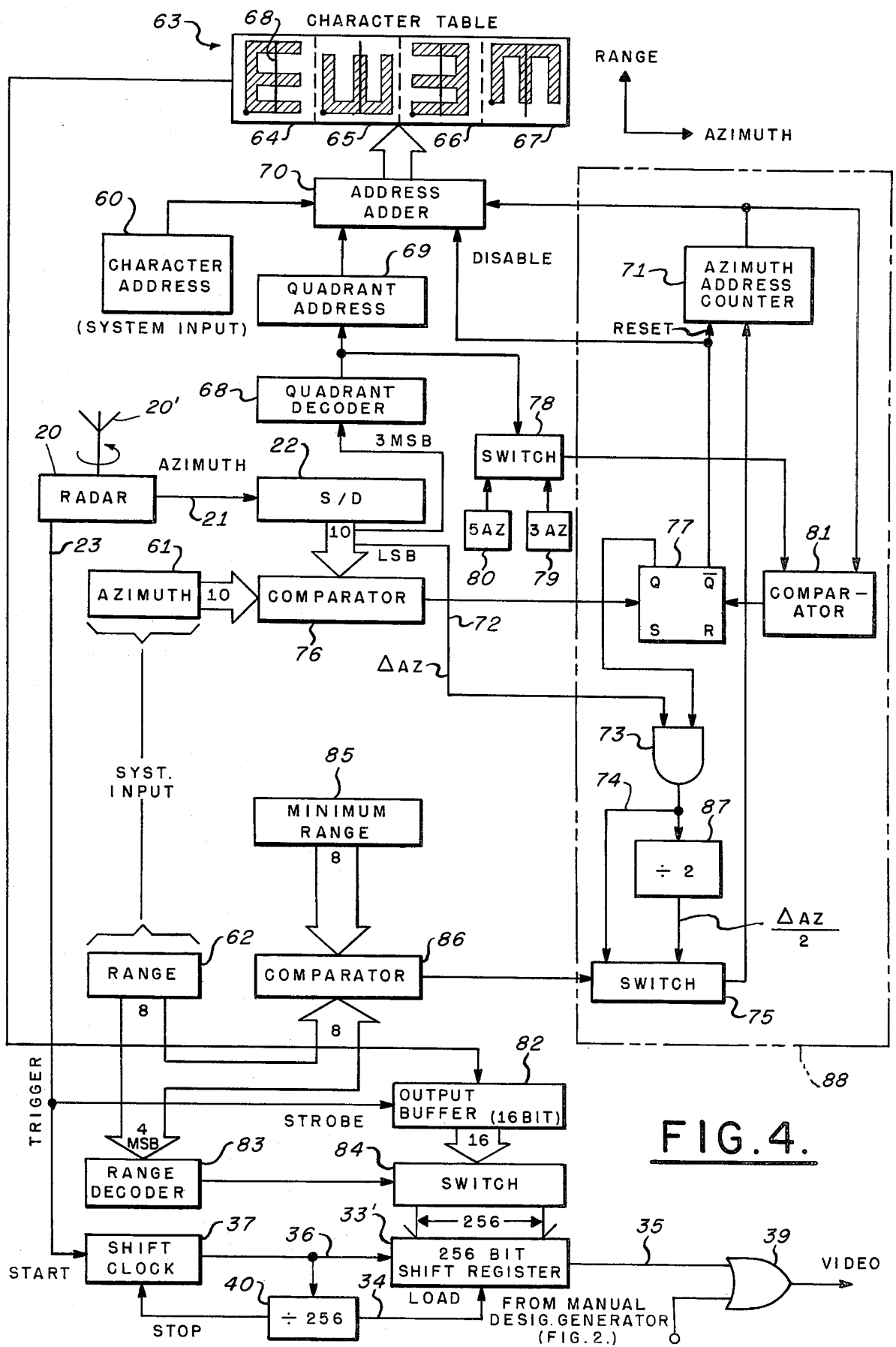
FIG. 4 is a schematic block diagram illustrating apparatus for generating alphanumeric and other localized characters in accordance with the invention.

Referring to FIG. 4, in which like reference numerals indicate like elements with respect to FIG. 2, apparatus for drawing alphanumeric characters and like symbology is illustrated. In a manner similar to that described with respect to FIG. 2, the radar system 20 provides an azimuth signal on the conductors 21 from, for example, a synchro pickoff coupled with the rotating radar antenna, which azimuth signal is converted into parallel ten bit digital format by the synchro-to-digital converter 22. As previously described, the radar 20 provides the radar trigger on the line 23.

The apparatus of FIG. 4 includes a character address buffer 60 which receives a digitally coded character request from the system in which the apparatus of FIG. 4 is included to command the display of a particular character selected from the character roster of the system. An azimuth buffer 61 and a range buffer 62 are included to receive the azimuth and range coordinates from the system in digital format at which the selected character is to be displayed on the PPI screen. The apparatus also includes a character table 63 which may be implemented, for example, as a read-only memory (ROM). The character table 63 is comprised of four sections 64, 65, 66, and 67, each of which stores the complete complement of characters and symbols that the system is capable of displaying. Each of the sections 64, 65, 66 and 67 of the character table 63 stores the symbology data in an orientation commensurate with readability in the associated quadrant of the PPI as illustrated in FIG. 3. The memory sections 64, 65, 66 and 67 store the symbology for display in quadrants (1), (2), (3) and (4) respectively. The alphabetic character "E" is illustrated in the appropriate orientations in the four sections of the character table.

As previously described, the 360 degrees of azimuth of the PPI display are quantized into 1,024 incremental azimuth sectors and the range from the PPI range center to the periphery of the display is quantized into 256 range bins. For convenience and legibility, the symbols and characters displayed in quadrants (1) and (3) are three incremental azimuth sectors wide and five range bins high. In quadrants (2) and (4) the characters and symbols are three range bins wide and five incremental azimuth sectors high. In sections 64 and 66 of the character table 63 corresponding to quadrants (1) and (3), respectively, each character or symbol is stored as three sixteen bit words corresponding to the three azimuth sectors that comprise the character width. The symbology in sections 65 and 67 of the character table 63 corresponding to quadrants (2) and (4), respectively, are each stored as five sixteen bit words, the five words corresponding to the five azimuth sectors comprising the height of the symbol. Since the data processing system in which the apparatus of FIG. 4 is incorporated utilizes sixteen bit words, for compatibility the character table 63 is implemented by a sixteen bit wide memory. In sections 64 and 66 of the memory the three words corresponding to the three azimuth sectors of each character utilize only the first five bits of the words corresponding to the five range bins of the character height and in sections 65 and 67 of the memory the five words corresponding to the five azimuth sectors of the height of the characters utilize only the first three bits thereof corresponding to the three range bins of the width of the characters. All of the unused bits of the sixteen bith words are set to zero. Thus each of the three words comprising a character in sections 64 and 66 of the memory are effectively five bit words and each of the five words for each of the characters in sections 65 and 67 of the memory are effectively three bit words. Thus, as discussed, the five bits of each word in memory sections 64 and 66 correspond to the five range bins comprising the height of the characters in quadrants (1) and (3) and the three bits of each word in memory sections 65 and 67 correspond to the three range bins comprising the width of the characters in quadrants (2) and (4).

The symbology data is stored in section 64 of the character table 63 as follows. Each of the words corresponding to an azimuth sector of the width of a character stores binary ONEs at those of the five bit positions corresponding to the range bins in which beam intensification is required. Similarly the remaining of the five bit positions of the word store binary ZEROs where beam blanking is required. A typical word symbolically represented at 68 in the memory section 64 for the character "E" would have the bit pattern 1 0 1 0 1. While the radar antenna and consequently the radar sweep 10 are rotating through one of the incremental azimuth sectors, the word corresponding to that azimuth section is provided by the memory and is utilized to provide the required intensification for each range sweep that occurs within the azimuth sector. When the radar antenna and hence the range sweep progresses to the next azimuth sector, the next word is addressed and provides the intensification for all of the range sweeps in that azimuth sector. In a similar manner, the symbology is stored in the sections 65, 66, and 67 of the memory 63 in the various orientations corresponding thereto.

The manner in which the memory 63 is addressed to provide the appropriate data words for writing the characters in the appropriate quadrants of the PPI display will now be explained. The three most significant bits from the ten bit output of the synchro-to-digital converter 22 determine in a well known manner in which quadrant the range sweep of the PPI is located. The three most significant bits of the azimuth position are applied to a quadrant decoder 68 which in turn provides a signal representative of the quadrant. The three MSB are utilized in order to detect the intercardinal points 45°, 135°, 225° and 315° as described above with respect to FIG. 1. The output of the quadrant decoder 68 is applied to a quadrant address generating block 69 which provides a base address in accordance with the quadrant for each of the corresponding sections 64, 65, 66 and 67 of the memory 63. For example, if the memory 63 were a 2,000 word memory, each section of the memory would consist of 500 words. When, for example, the three most significant bits of the azimuth position indicates quadrant (1), the quadrant decoder 68 causes the quadrant address generation block 69 to provide a base address of 0 0 0. When the range sweep is in quadrant (2), the quadrant address provided by the block 69 would be 500. In a similar manner, when the range sweep is in quadrant (3) or quadrant (4), the quadrant address generation block 69 provides base addresses of 1000 and 1500 respectively.

The character address buffer 60 provides an address in accordance with the character to be written. For example, the three words storing the character "E" in section 64 of the memory may be at addresses 10, 11 and 12. The three words storing the character "E" in section 66 may be at addresses 1010, 1011 and 1012. The five words storing the character "E" in sections 65 and 67 of the memory may be located at addresses 510, 511, 512, 513 and 514 for section 64 and at addresses 1510, 1511, 1512, 1513 and 1514 for section 67. Thus the character address buffer 60, for writing the character "E" in any quadrant of the PPI display, provides the relative starting address 10 for the character in each of the memory sections. The outputs from the quadrant address generation block 69 and the character address buffer 60, which are in binary format, are applied as inputs to a conventional address adder 70 which in turn provides the sum thereof. The output of the address adder 70 is utilized to address the memory 63. In the example given, if it is desired to draw the letter "E" in quadrant (2), the character address 10 is added to the quadrant address 500 providing an address of 510 which in the example given, is the address of the first word for the letter "E" in section 65 of the memory.

An azimuth address counter 71 is utilized to sequentially address the three words comprising each character or symbol in the memory sections 64 and 66 and the five words in the memory sections 65 and 67 for the sequential display of these words in sequential azimuth sectors, thereby writing the selected symbol or character.

As previously described, the 360 degrees of the PPI display is for convenience quantized into 1,024 incremental azimuth sectors. The least significant bit of the ten bit azimuth word from the synchro-to-digital converter 22 therefore in a well known manner provides a square wave signal in synchronism with the traversal of the range sweep through the incremental azimuth sectors. The lease significant bit signal from the synchro-to-digital converter 22 is provided on a lead 72 through an AND gate 73, a lead 74 and a switch 75 as the clock input to the azimuth address counter 71. Thus as the radar antenna rotates through each azimuth sector, the azimuth address counter 71 is incremented by one count. The digital output of the counter 71 is applied as an input to the address adder 70 wherein it is added to the quadrant address provided by the block 69 and the character address provided by the block 60. Thus with a particular section of the memory 63 selected by the quadrant address from the block 69 and a particular character in that section selected by the character address from the block 60, the address counter 71 sequentially addresses the words comprising the character in synchronism with the radar sweep traversing the azimuth sectors of the display.

The manner in which the apparatus of FIG. 4 positions the selected character at a particular azimuth will now be described. As previously discussed, the azimuth buffer 61 provides the azimuth coordinate for the starting point of the character, which coordinate is compared in a comparator 76 with the radar antenna azimuth from the synchro-to-digital converter 22 and when the antenna attains the azimuth stored in the buffer 61 the comparator 76 sets a flip-flop 77. When the flip-flop 77 is set the AND gate 73 is enabled permitting the LSB signal from the synchro-to-digital converter 22 to be applied through the switch 75 to the azimuth address counter 71. With the quadrant address block 69 providing the address for the appropriate section of the memory 63, and the character address buffer 60 providing the address for the desired character, the azimuth address counter 71 sequentially addresses the words comprising the character as the counter 71 is incremented by the LSB signal from the synchro-to-digital converter 22 in synchronism with the range sweep 10 sequentially traversing the azimuth sectors that follow the azimuth coordinate in the buffer 61.

As previously described, the symbology in quadrants (1) and (3) of the PPI display as illustrated in FIG. 3 are three azimuth sectors wide while the symbology in quadrants (2) and (4) are five azimuth sectors high. The manner in which these dimensions are controlled will now be described. In quadrants (1) and (3) the azimuth counter 71 is controlled to sequentially provide counts 0, 1 and 2 and in quadrants (2) and (4) the counter 71 is controlled to sequentially count from 0 through 4 in response to the azimuth sector signals on the lead 72 to provide the sequential addresses for addressing the sequential character words in the memory 63. A switch 78 is responsive to numbers representative of three azimuth sectors and five azimuth sectors as indicated at 79 and 80 respectively. In the present embodiment, the block 79 provides the constant number 2 in binary digital format and the block 80 provides the binary digital constant 4. When the range sweep is in quadrant (1) or (3), the quadrant decoder 68 controls the switch 78 to provide the constant from the block 79 to a comparator 81. When the range sweep is in quadrant (2) or (4), the quadrant decoder 68 controls the switch 78 so as to provide the constant from the block 80 to the comparator 81. The other input to the comparator 81 is provided by the digital output from the azimuth address counter 71. When the count in the counter 71 attains the number provided through the switch 78, the comparator 81 resets the flip-flop 77 which disables the AND gate 73, resets the counter 71 and disables the address adder 70. Thus when the range sweep is in quadrant (1) or (3) and the azimuth address counter 71 counts three increments corresponding to three azimuth sectors as designated by the signal on the lead 72, the flip-flop 77 cuts off the clock input to the counter 71 via the AND gate 73, resets the counter 71 and disables the address adder 70. Similarly, when the range sweep is in quadrant (2) or (4), the azimuth counter 71 counts five increments representing five azimuth sectors before the flip-flop 77 cuts off its clock input, resets the counter 71 and disables the address adder 70.

The manner in which the apparatus of FIG. 4. positions the character in range on the PPI display will now be explained. The word currently being addressed in the memory 63 by the address adder 70 is strobed into an output buffer 82 by means of the radar trigger on the line 23. Thus preparatory to each range sweep, the symbol data for the azimuth sector in which the sweep is occurring is strobed into the buffer 82. As previously explained, the range coordinate at which the character is to be written is provided by the range buffer 62. The four most significant bits of the range coordinate from the buffer 62 are provided to a range decoder 83 which decodes the four range bits into one of sixteen control lines. Since, as previously explained, the PPI range is quantized into 256 range bins, the four most significant bits of range represent sixteen range positions, each separated from the next by sixteen range bins. Thus the sixteen control lines from the range decoder 83 represent these sixteen range locations.

The sixteen control lines from the range decoder 83 are connected to a switch 84. The input to the switch 84 is provided by the parallel sixteen bit output from the buffer 82 and the output from the switch 84 is comprised of 256 lines. The switch 84 functions to connect its sixteen inputs selectively to sixteen of the 256 outputs thereof. The sixteen inputs to the switch 84 may be connected selectively to the first group of sixteen outputs thereof or to the second group of sixteen outputs thereof or to any consecutive group of sixteen outputs of the switch 84. Since there are 256 outputs from the switch 84, there are sixteen such groups to which the input bits can be connected. The selection as to which of the output groups the input to the switch 84 is connected is controlled by the sixteen lines from the range decoder 83.

In a manner similar to that described with respect to FIG. 2, FIG. 4 includes a 256 bit shift register 33' which performs a similar function to the shift register 33 of FIG. 2. In response to the shift clock 37, the 256 bits of the register 33' are shifted through the OR gate 39 to provide the video control bits in the 256 range bins of each range sweep. Prior to each range sweep the signal on the lead 34 loads the 256 bits from the switch 84 into the register 33'. Since the 16 bit character word has been positioned at a particular group of 16 of the 256 outputs of the switch 84 in accordance with the range coordinate provided by the range buffer 62, the character will be drawn on the PPI screen at the range coordinate selected by the system in which the apparatus of FIG. 4 is incorporated.

As previously discussed, the size of the characters and symbols are increased when they are written at a range less than a minimum range to maintain uniformity of character size over the face of the PPI display. Since the azimuth sectors of the PPI display are pie shaped and therefore decrease in width as the range decreases, it is necessary in quadrants (1) and (3) to increase the width of the characters and in quadrants (2) and (4) to increase the height of the characters at ranges less than a predetermined minimum range. At ranges greater than the predetermined minimum range the characters in quadrants (1) and (3) are three azimuth sectors wide. At ranges less than the predetermined minimum range the width of the characters are increased to six azimuth sectors. At ranges greater than the minimum range in quadrants (2) and (4) the characters are five azimuth sectors high. This character dimension is increased to ten azimuth sectors at ranges less than the minimum range.

In order to effect this change in character dimension the apparatus of FIG. 4 includes a minimum range buffer 85 that stores the predetermined range value at which the character dimension is changed. The range coordinate, stored in the range buffer 62, at which the character is to be written, is compared with the minimum range value from the buffer 85 in a comparator 86. The output of the comparator 86 is coupled to the switch 75 which selectively connects one of its two inputs to provide the clock input to the azimuth address counter 71. One of the inputs to the switch 75 is provided by the previously described $\Delta AZ$ clock from the synchro-to-digital converter 22 through the AND gate 73 and the lead 74. The other input to the switch 75 is provided by the output from the AND gate 73 passed through a divide by two circuit 87. Thus the switch 75 selectively provides wither $\Delta AZ$ or $\Delta AZ/2$ to the counter 71, in accordance with the output of the comparator 86.

When the range coordinate of the character from the buffer 62 is greater than the minimum range provided by the buffer 85 the comparator 86 controls the switch 75 to provide the $\Delta AZ$ clock on the lead 74 to the azimuth address counter 71. When the range coordinate of the character is less than or equal to the minimum range, the comparator 86 controls the switch 75 to provide the output of the divide by two circuit 87 as the clock input to the azimuth address counter 71.

Thus in the operation of the described character size control apparatus, when the character is written at a range less than or equal to the minimum range the character width in quadrants (1) and (3) are extended over twice the number of azimuth sectors than when the character is written at a range greater than the minimum range. Similarly in quadrants (2) and (4), when the character is written at a range less than or equal to the minimum range the characters are extended in height over twice the azimuth sectors than when the character is written at greater than the minimum range.

In summary of the operation of the apparatus of FIG. 4, the system in which the apparatus is incorporated inserts a character address designating the symbology to be written as well as the azimuth and range coordinates at which the character is to be written into the buffers 60, 61 and 62 respectively. When the radar antenna and consequently the range sweep 10 attains the azimuth stored in the buffer 61, the comparator 76 sets the flip-flop 77 which enables the address adder 70. The address adder 70 combines the quadrant address in accordance with the quadrant detected by the quadrant decoder 68, the character address provided by the buffer 60 and the output of the azimuth address counter 71 to address the first word of the character stored in the section of the memory corresponding to the quadrant in which the azimuth coordinate in the buffer 61 is located. As the radar antenna sweeps through the first azimuth sector of the character, the radar triggers on the line 23 continually strobe the addressed word from the memory 63 into the buffer 82. The range decoder 83 and switch 84 position the word, in accordance with the range coordinate in the buffer 62, in the output shift register 33' in accordance with the range at which the character is to be written. Thus during each range sweep the cathode ray tube beam is intensified in accordance with the bits stored in the addressed word so as to write the corresponding portion of the character in the azimuth sector. As the radar antenna progresses through the successive azimuth sectors over which the character is to be written the azimuth address counter 71 is incremented for each azimuth sector thereby addressing the successive words comprising the character. When the azimuth address counter 71 attains the last azimuth sector for the character (3AZ or 5AZ as selected by the switch 78), the comparator 81 resets the flip-flop 77 cutting off the clock input to the counter 71, resets the counter 71 and disables the address adder 70.

The above description of FIG. 4 delineates the manner in which a single character or symbol is written at a particular position on the PPI display. In the operative system in which the apparatus of FIG. 4 is included it is desirable to write plural characters at plural range locations along the same range sweep. Accordingly, a plurality of identical components to those illustrated within the dashed line block 88 are included in accordance with the number of plural characters that it will be necessary to write along a range sweep. The plurality of blocks 88 are time multiplexed into the remainder of the apparatus in a conventional manner. Prior to each radar trigger the character address and the azimuth and range coordinates for each of the plural character to be written along the next occurring range sweep are sequentially inserted into the buffers 60, 61 and 62 in synchronism with the associated blocks 88 being multiplexed into the apparatus. The data for the characters are inserted into the buffers seriatim and the character table 63 is accordingly addressed to sequentially provide the data words associated with the plural characters to the output buffer 82 wherefrom they are loaded into the output shift register 33' at their appropriate range locations in accordance with their associated range coordinates from the buffer 62. Thus when the contents of the shift register 33' are shifted out in synchronism with the range sweep the appropriate portions of the plural characters are intensified in accordance with the bits loaded into the register 33' from the plural characters thereby writing the plural characters along the range sweep.

It is appreciated that when utilizing the plural character writing capability of the apparatus, the strobe input to the output buffer 82 is provided by circuitry (not shown) which will generate multiple strobes prior to each radar trigger that will sequentially strobe the data words from the plural characters into the ouput buffer 82 for loading into the output shift register 33' preparatory to being shifted out in accordance with the writing process described.

It will furthermore be appreciated that for the plural character writing arrangement it may be necessary to utilize either a 256 stage buffer register between the switch 84 and the output shift register 33' in order to assemble the plural character words prior to loading into the output shift register 33' or alternatively to utilize a second 256 bit output shift register for alternate use with respect to the register 33' on the alternate range sweeps. One of the output shift registers may be utilized to provide the video data while the data words from the plural characters are being assembled from the switch 84 into the alternate register. It is appreciated that with these arrangements the multiple strobes preceding the radar trigger would be utilized to insert the character words into the additional 256 bit register.

The bit serial output from the shift register 33' is combined in the OR gate 39 with the bit serial manual designation marker data from the shift register 33 (FIG. 2) to provide combined interleaved video bits for interleaving the writing of the symbology from the apparatus of FIG. 4 with the manual designation marker from the apparatus of FIG. 3 along the range sweeps of the PPI display. Thus an integrated display presentation is provided in radar real time as the radar antenna and deflection yoke of the cathode ray tube are rotating to display the real time radar target returns.

Figure 5:
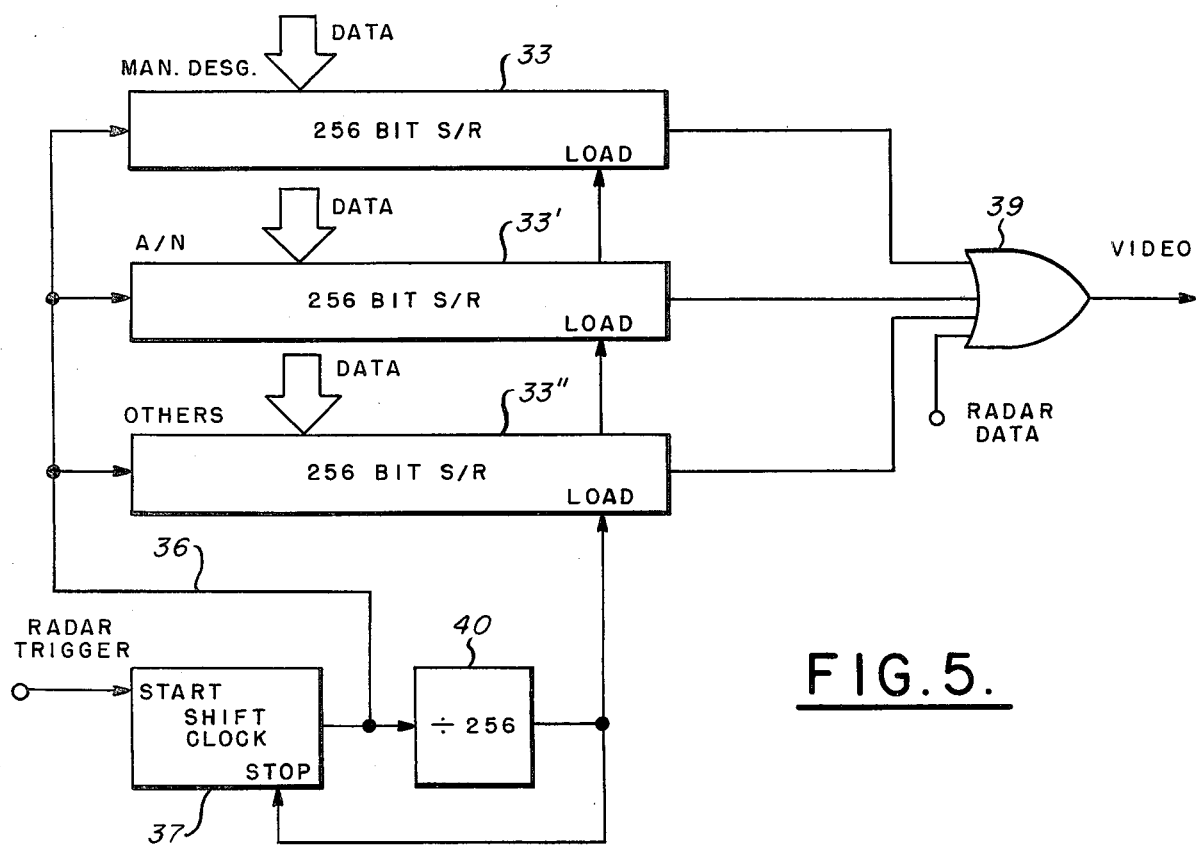
FIG. 5 is a schematic block diagram illustrating apparatus for combining the symbology data generated by the apparatus of FIG. 2 and FIG. 4 with the normal radar data for integrated real time presentation on the PPI.

Referring to FIG. 5, in which like reference numerals designate like components with respect to FIGS. 2 and 4, apparatus for combining all of the marker, symbology and radar data for providing an integrated display in radar real time is illustrated. As previously discussed with respect to FIGS. 2 and 4, the output shift registers 33 and 33' are loaded with 256 bits of video data corresponding to the 256 range bins into which the range sweep is quantized and thereafter the bits are shifted synchronously through the OR gate 39 in synchronism with the range sweep so as to write the interleaved data. Further shift registers such as shift register 33" may also be included to provide any other symbology that it may be desired to write. As indicated, the radar return data from the radar system are combined with the symbology data in the OR gate 39 to thereby provide the complete integrated display.

It is appreciated that alternatively the 256 data inputs to each of the shift registers 33, 33' and 33" may themselves be combined in a parallel OR gate arrangement for loading all of the interleaved and integrated data into a single 256 bit shift register, the contents of which being serially shifted to provide the PPI display video in synchronism with the range sweeps.

Referring momentarily back to FIG. 2, when the operator positions and holds the range switch 25 to the OUT position, the range ring 12 (FIG. 2) moves outwardly in range at a uniform rate. When the operator returns the range switch 25 to its central position, the motion of the range ring 12 ceases. Similarly, when the operator positions and holds the range switch 25 to the IN position, the range ring 12 moves inwardly in range at a uniform rate until the operator releases the switch.

In the system of the present invention it may be desirable for operation of the range switch 25 to result in differently controlled motion of the range ring 12. For example, it may be desired that when the operator positions the range switch 25 to the OUT position and holds the switch thereat, the range ring 12 will jump outwardly one range increment and remain thereat for a short period of time and thereafter commence moving outwardly in range at a rate that increases with time. Should the operator return the switch to the central position while the range ring 12 is hesitating after having effected the range increment jump, the range ring 12 will then remain at its then present location. If the operator again should actuate the switch 25 to the OUT position, the range ring 12 will again jump one range increment and then hesitate before commencing outwardly in range at a rate that increases with time. Similarly, inward motions of the range ring 12 may be effected by actuating the range switch 25 to the IN position.

Figure 6:
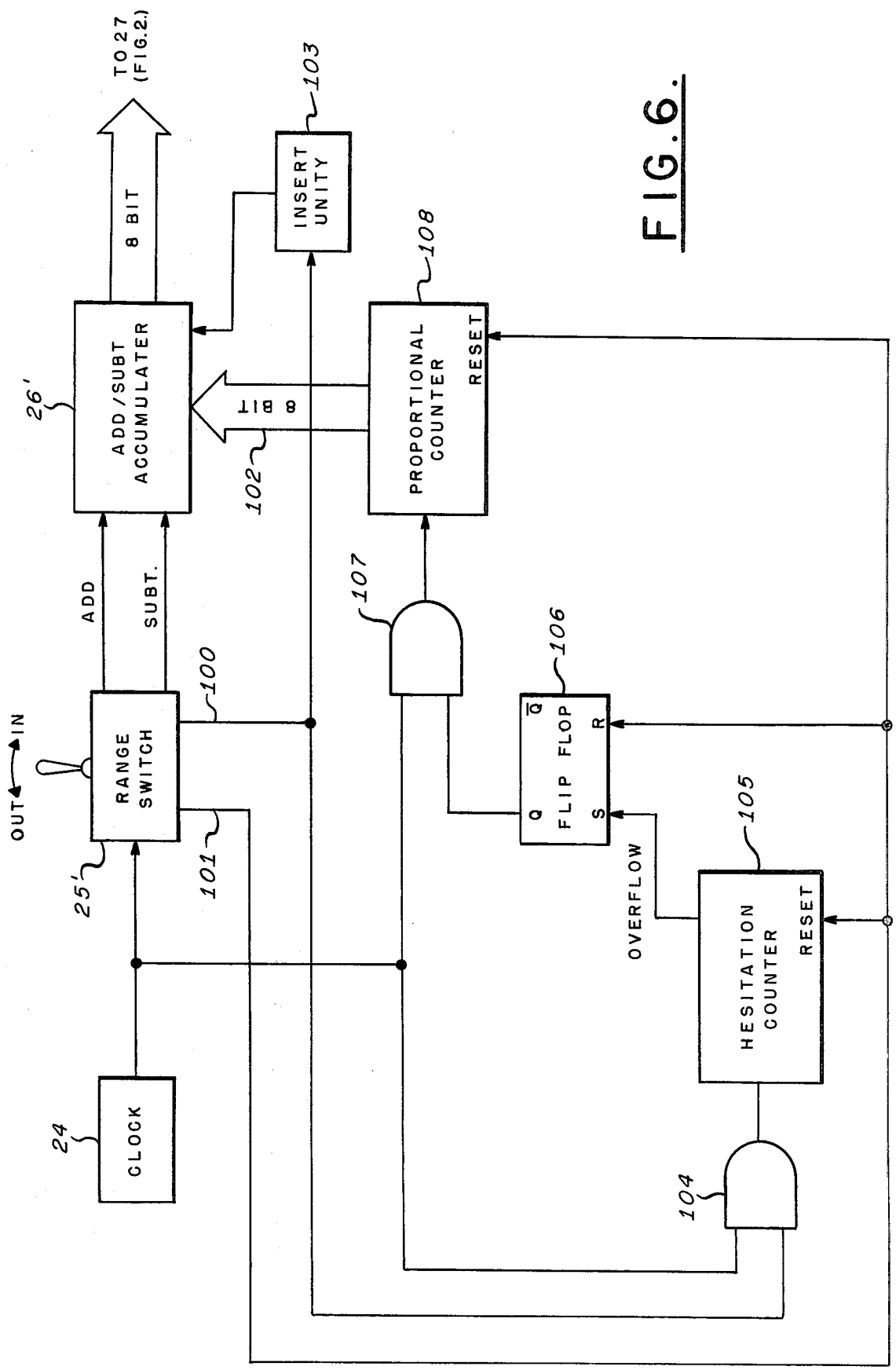
FIG. 6 is a schematic block diagram illustrating apparatus useful in generating range signals for the circuit of FIG. 2.

Referring to FIG. 6, in which like reference numerals indicate like components with respect to FIG. 2, apparatus for effecting the above described positioning of the range ring 12 is illustrated. The apparatus of FIG. 6 is utilized in place of components 24, 25, and 26 of FIG. 2 to effect the motion. The output of the clock pulse generator 24 is applied to a range switch 25' which when the switch 25' is actuated to its OUT position, directs the clock pulses to an ADD output lead thereof and when the switch is operated to the IN position, the clock pulses are directed to a subtract output lead thereof. When the switch is returned to its central position clock pulses are not transmitted to either of the output leads. When the switch 25' is operated to either of its positions an output lead 100 thereof is energized and when the switch is returned to its central position a pulse is provided on an output lead 101 thereof. The add and subtract leads from the switch 25' are applied to the add and subtract inputs of an add/subtract accumulator 26'. In the present embodiment the accumulator 26' comprises a parallel eight stage accumulator that adds the digital eight bit word on the input 102 thereof to its present contents whenever a pulse is applied to the add lead. Similarly, the digital number provided on the input 102 is subtracted from the present contents of the accumulator 26' whenever a pulse is applied on the subtract lead thereof. The eight bit parallel output from the accumulator 26' is applied to the switch 27 of FIG. 2 to position the range ring 12 in accordance with the contents of the accumulator in the manner described above with respect to FIG. 2.

When the range switch 25' is operated to either its IN or OUT position, the signal on the lead 100 causes the contents of the accumulator 26' to be incremented or decremented by unity via a block 103 in accordance with whether the switch 25' is actuated to the OUT or IN position respectively. The signal on the lead 100 also enables an AND gate 104 which transmits the clock pulses from the clock pulse source 24 to a counter 105 denoted as a "hesitation" counter for reasons to be clarified.

When the counter 105 overflows in response to counting the clock pulses from the clock pulse generator 24, a flip-flop 106 is set which enables an AND gate 107. The AND gate 107, when enabled, transmits the clock pulses from the clock pulse source 24 to a counter 108 denoted as a "proportional" counter. The counter 108 is an eight bit counter that provides the input 102 to the accumulator 26'. The pulse output on the lead 101 from the switch 25' is applied to reset the counters 105 and 108 to their zero state and to reset the flip-flop 106.

When the switch 25' is in its central position and the circuit of FIG. 6 is in its quiescent state, the counters 105 and 108 as well as the flip-flop 106 are reset and the AND gates 104 and 107 are disabled. With no clock pulses transmitted to the accumulator 26' the eight bit number resident therein remains quiescent and the range ring 12 of FIG. 1 is drawn at a constant range circumference. When the range switch 25 is actuated to its OUT position, the signal on the lead 100 causes the number in the accumulator 26' to be incremented by unity thus causing the range ring 12 to jump by one range bin. The signal on the lead 100 also enables the AND gate 104 which transmits the clock pulses to the hesitation counter 105. In the time that the hesitation counter 105 is counting toward overflow, the number in the accumulator 26' remains quiescent since at this time the output from the proportional counter 108 is zero. During the time that the hesitation counter 105 is counting, the range ring 12 hesitates at its incremented position. When the hesitation counter 105 overflows the flip-flop 106 is set which enables the AND gate 107 to transmit the clock pulses therethrough to the proportional counter 108. Since the range switch 25' is being held in its OUT position, the clock pulses are directed to the add input of the accumulator 26'. The first clock pulse to occur after the AND gate 107 is enabled, increases the count in the proportional counter 108 by one. This count is added to the number resident in the accumulator 26' initiating motion of the range ring 12 in the outward direction. The next occurring clock pulse increases the count in the proportional counter 108 to two, which number is then added to the number in the accumulator 26' which results in the range ring moving outwardly at an increasing rate. As further clock pulses increase the number in the proportional counter the increasing input 102 to the accumulator 26' causes the number stored therein to increase at a rate that increases with time. Thus the longer the range switch 25' is held in its OUT position, the faster the range ring moves in the outward direction. When the range switch 25 is released to its central position, the clock pulses are cut off from the accumulator 26' and a pulse is applied to the line 101 which resets the counters 105 and 108 and the flip-flop 106 thus disabling the AND gate 107. The AND gate 104 is disabled by the signal on the lead 100 going to a low state. Thus when the range switch 25' is returned to its central position the number in the accumulator 26' stops changing and the rangering 12 remains positioned at the range commanded by the resulting number in the accumulator 26'. If the range switch 25' is actuated to the OUT position and thereafter released repetitively, the hesitation counter 105 will repetitively be reset before it overflows and the proportional counter will repetitively be reset to zero. When the range switch 25' is operated in this manner the accumulator 26' is incremented by unity for each actuation of the switch 25' thereby causing the range ring 12 to increase in range by incremental motions.

Actuating the range switch 25' to the IN position in the manner described above results in concomitant motion of the range ring 12 in the inward direction.

The components of the apparatus described above with respect to FIGS. 2, 4, 5 and 6 may be implemented by conventional discrete components such as discrete digitally implemented components or may alternatively implemented by programmed processing elements. The components of the above described apparatus may also be implemented by program segments of a stored program stored in a digital computer. For example, numerous suitable microprocessors with associated program assemblers are commercially available for implementing such apparatus.

Figure 7:
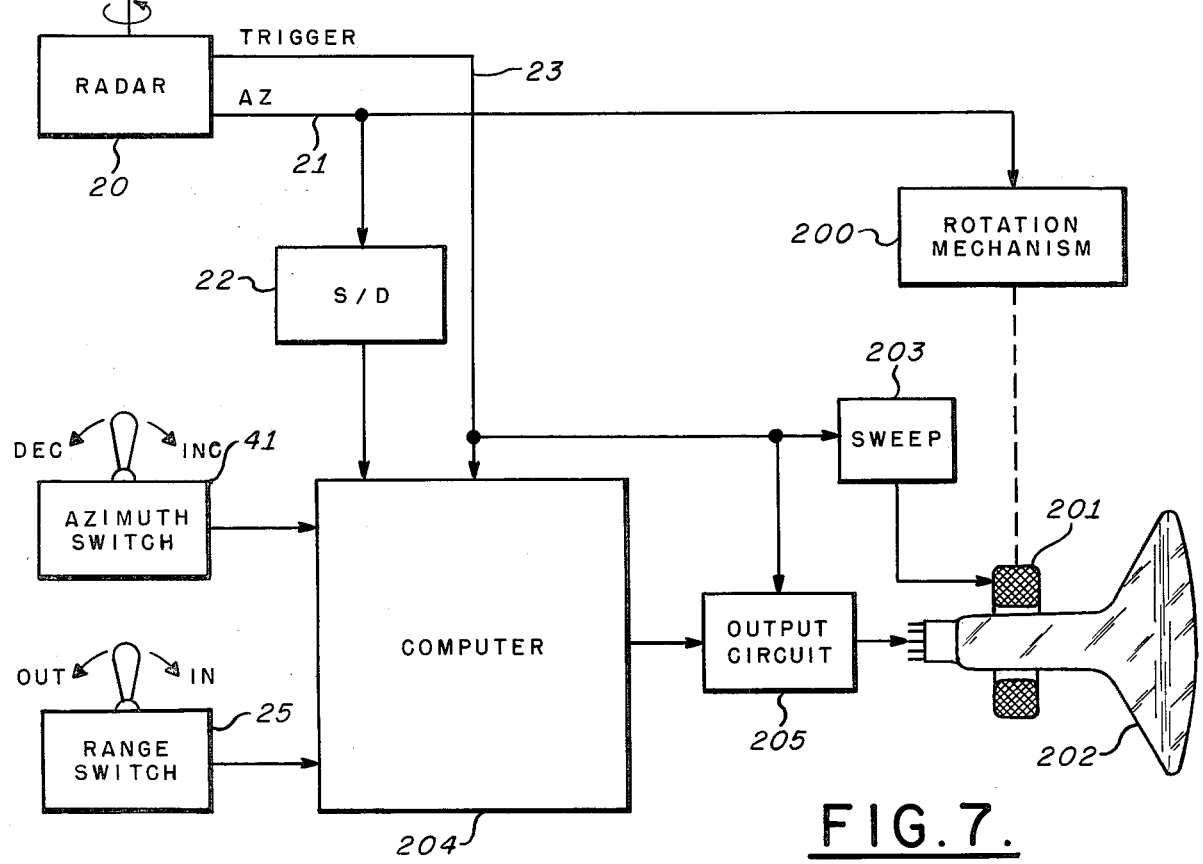
FIG. 7 is a schematic block diagram illustrating a programmed computer embodiment of the invention.

Referring to FIG. 7, in which like reference numerals indicate like components with respect to FIGS. 2, 4, 5 and 6, a programmed digital computer embodiment of the invention is illustrated. As previously described, the radar system 20 provides an azimuth signal on the conductors 21 in accordance with the azimuthal position of the rotating radar antenna. The signal on the conductor 21 may be provided by a conventional synchro device coupled to the antenna. The azimuth signal on the leads 21 is applied to a conventional rotation mechanism 200 which is coupled to the rotating yoke 201 of the cathode ray tube 202. The rotation mechanism 200 may be implemented by, for example, a well known mechanical or electronic repeater mechanism. The radar trigger on the lead 23 is applied to a conventional radar sweep circuit 203 which generates the range sweeps on the PPI in a well known manner. It is appreciated that a fixed yoke with an electronically rotated deflection field or other like arrangements may be utilized.

The radar trigger on the line 23 and the azimuth signal via the synchro-to-digital converter 22, as well as the outputs of the range switch 25 and the azimuth switch 41, are applied as inputs to a programmed digital computer 204 which may, for example, be implemented by a suitably programmed microprocessor. The output of the computer 204 comprises the 256 bit output word previously described with respect to the foregoing figures which is applied to an output circuit 205. The output circuit 205 comprises any of the 256 bit shift register arrangements described above as well as the shift clock 37 and the divide by 256 circuit 40 previously described with respect to the foregoing figures. The bits of the parallel 256 bit output word from the computer 204 are loaded into the shift register means and are serially transmitted to provide the PPI display video intensification as previously discussed. As described above, the output circuit 205 receives the radar trigger on the line 23 to synchronize the transmission of the data with the radar sweep.

With the exception of the radar 20, the synchro-to-digital converter 22, the range switch 25, the azimuth switch 41 and the aforedescribed output circuit 205, the remainder of the blocks of FIGS. 2, 4, 5 and 6 are implemented by suitable program segments in the microprocessor 204. It is readily apparent to one skilled in the art familiar with microprocessor assembly language programming that each of the functional blocks heretofore described may be coded as program segments and subroutines with the program flow provided by software linkages corresponding to the illustrated conductors. For example, the function of the clock 24 is performed by the basic iterations of the program controlled in a conventional manner. The switches 25 and 41 and the radar trigger on the lead 23 are connected to input discretes of the microprocessor 204 and the parallel digital output of the synchro-to-digital converter 22 is applied to one of the input channels thereof. During each program iteration by means of conventional discrete interrupts the computer 204 senses the states of the switches 25 and 41 and determines if a radar trigger has occurred. The azimuth information is inputted by a conventional I/O channel read instruction. The manner in which the various counters illustrated in the aforedescribed figures are implemented in the computer 204 are well known. For example, the up/down counter 26 of FIG. 2 may be a reserved location in scratch pad storage, the contents of which are transferred to the accumulator of the computer 204 and incremented or decremented in accordance with the sensed state of the range switch 25. The altered number is then transferred back to the memory location reserved for the counter 26. Thus the number in the software up/down counter 26 is incremented or decremented in accordance with the sensed actuations of the range switch 25 as the operative program is reiterated. In a similar manner, a predetermined location in the computer memory is reserved for the azimuth up/down counter 42.

The program includes a conventional decoding routine to perform the aforedescribed functions of the decoder 31 and another routine to perform the described functions associated with the components 48, 49, 50 and 51. It is readily apparent how the routine can add and subtract the quantity $\Delta R$ from the range counter 26 number as discussed with respect to the components 48 and 49 so as to provide the azimuth window 13 of FIG. 1.

Program control is selectively transferred either to the routine associated with the decoder 31 for drawing the range ring 12 or to the routine associated with the components 48, 49, 50 and 51 to draw the azimuth window 13 in a manner similar to that described above with respect to the comparator 43. The digital azimuth provided by the synchro-to-digital converter 22 is transferred to the accumulator of the computer 204 and a Test For Equal instruction is utilized with respect to the memory location of the azimuth counter 42 to provide a transfer to the appropriate routine in a manner similar to that performed by the previously described switch 27. A separate $\Delta$ azimuth counter location in memory may be utilized to perform the function of the counter 47 and an appropriate test instruction utilized to transfer out of the routine for drawing the azimuth window and back to the routine for drawing the range ring 12.

In a similar manner, software routines, tests and linkages are provided for implementing the remainder of the aforedescribed functional blocks of FIGS. 2, 4, 5 and 6. The character table addressing of FIG. 4 by means of the address adder 70 is readily coded by convenient software routines as well as are the remaining functions of the drawing. The numerous functions and tests described above with respect to FIG. 6 are also readily implemented. For example, the function of the accumulator 26' may be performed in a manner similar to that described above with respect to the up/down counter 26 of FIG. 2 by selectively utilizing the add and subtract instructions of the computer repertoire as well as the load, store and test instructions so as to combine the aforedescribed numbers in the aforedescribed manner.

By suitable data transfer instructions the 256 bit output word is assembled with all of the previously described video data bits interleaved in accordance with the various symbology to be drawn during a range sweep. By an appropriate I/O instruction, the computer 204 outputs the assembled 256 bit word to the output circuit 205 wherein it is converted into the serial bit video data in synchronism with the range sweep as previously described. Thus it is appreciated that all of the symbology is provided to the PPI display and written in radar real time as the rotating yoke 201 sweeps out the PPI raster for the display of the radar target returns.

It will be appreciated from the foregoing that although positioning of the manual designation marker in range and azimuth was described in terms of manipulation of the range switch 25 and the azimuth switch 41, a conventional digital keyboard may be provided to input a number that would instantaneously position the range ring 12 and the azimuth box 13 to keyed in coordinates.

The aforedescribed embodiments of the invention were explained in terms of specific character sizes and a display screen divided into quadrants for convenience. It is appreciated that the given dimensions and specifications were for purposes of explanation, other parameters being usable to the same effect in practicing the invention. The above described embodiment of FIG. 2 was explained in terms of utilizing the bit output 46 from the synchro-to-digital converter 22 as the clock input to the counter 47 and the bit output 54 for providing the dashed line range ring 12. It will be appreciated that the same bit outputs as well as different bit outputs from the converter 22 may be utilized for the respective purposes in accordance with parameters of the system.

It is appreciated from the foregoing that the present invention may be utilized with any radar PPI display without necessitating any modification to the existing radar. Apparatus is provided for writing characters of any type on radar displays which have a rotating yoke, a fixed yoke or a like arrangement. The character writing capability may be utilized for such purposes as displaying messages on the PPI screen, displaying geometric figures in selected portions of the PPI and in target identification. The manual designation marker may be utilized, inter alia, to determine range and bearing of a target, to determine when a target passes through a particular range and bearing or to determine the range and bearing of a target for acquisition by a track while scan radar system. The invention provides the display of characters and geometric figures on a radar PPI without the addition of character generators and in the instance of a rotating yoke radar system without adding a second deflection coil and additional sweep circuitry. Additionally the prior art problem of designating a target on a rotating yoke indicator without modifying the radar sweep circuitry is solved by the present invention. The acquisition marker and the symbology are displayed in radar real time without the alignment problem encountered when utilizing a separate yoke or separate sweep circuitry. With the present invention the resolution of the written characters is limited primarily by the spot size of the PPI. The invention is adaptable to any radar system regardless of the phosphorescence of the PPI.

It will furthermore be appreciated that in the preferred embodiment of the invention a synchro pickoff was utilized to provide the azimuth data via the synchro-to-digital converter 22. If, however, synchro antenna position information is not available, any suitable digital encoder may be coupled to the antenna to provide the requisite data. The present invention may be utilized in presenting radar video past position history, in assigning identifying marks such as alphanumerics to video returns, in portraying projected course lines or danger lines into a radar display, or of writing target information such as collision avoidance information directly on the radar PPI display Although the invention was described in terms of a radar system utilizing a rotating antenna and a rotating yoke PPI, it will be appreciated that the invention may be utilized in any scanned antenna radar system with any corresponding PPI display arrangement. Electronically scanned antennas or switched antenna array systems may also be utilized to the same effect.

For the purposes of the appended claims, the term symbol is utilized in its generic sense to include symbols, characters such as alphanumeric characters, geometric figures, other localized forms and the like.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Apparatus for writing symbology on a display face of cathode ray tube means of plan position indicator means of a radar system, said plan position indicator means having writing means for writing on said display face and including a video input to control intensification of said display face, said writing means using range sweeps rotatably scanning in azimuth for writing radar returns on said display face, said apparatus writing said symbology on said display face via said writing means in radar real time, comprising
    symbology data generating means for generating data signals required to intensify said display face along said range sweeps at quantized range locations therealong to write said symbology on said display face, and
    means for serially applying said data signals to said video input in synchronism with said range sweeps to intensify said display face at said quantized range locations in accordance with said data signals,
    thereby writing said symbology on said display face via said writing means in radar real time,
    said writing means including beam deflection means for generating a rotating beam deflection field, said beam deflection means including means for generating said range sweeps whereby said range sweeps scan in azimuth,
    said symbology data generating means comprising means for generating parallel digital bit signals corresponding to said quantized range locations, respectively, in accordance with said symbology to be written on said display face,
    said means for serially applying said data signals comprising parallel-to-serial converter means responsive to said parallel digital bit signals for serially applying said bit signals to said video input in synchronism with said range sweeps to intensify said display face at said quantized range locations in accordance with the binary value of said bit signals.

2. The apparatus of claim 1 in which said parallel-to-serial converter means comprises shift register means into which said parallel digital bit signals are loaded for serially shifting said bit signals to said video input in synchronism with said range sweeps.

3. The apparatus of claim 2 in which said radar system provides a radar trigger signal in synchronism with transmissions of said radar system, said means for generating said range sweeps being responsive to said radar trigger signal for generating said range sweeps synchronously therewith and in which said shift register means includes means responsive to said radar trigger signal for synchronizing said serial shifting of said bit signals to said video input with said radar trigger signal.

4. The apparatus of claim 1 in which said radar system includes radar antenna means scannable in azimuth and in which said beam deflection means comprises means for causing the cathode ray tube beam to effect radially directed range sweeps in synchronism with transmissions of said radar system at angular orientations in synchronism with antenna azimuth.

5. The apparatus of claim 4 in which said beam deflection means comprises a rotating yoke rotating in synchronism with antenna azimuth.

6. The apparatus of claim 1 in which
said symbology data generating means comprises a plurality of symbology data generators each comprising means for generating parallel digital bit signals required to intensify said display face along said quantized range locations in accordance with the symbology to be written, and
said means for serially applying said data signals includes means for combining said digital bit signals from said respective symbology data generators to provide combined digital bit signals for serial application to said video input for the writing of symbology provided by said symbology data generators respectively.

7. The apparatus of claim 1 in which said symbology data generating means includes acquisition marker generating means for generating said parallel digital bit signals in accordance with an acquisition marker comprising a range ring and an azimuth geometric figure to be written on said display face.

8. The apparatus of claim 7 in which said acquisition marker generating means comprises range ring generating means and azimuth geometric figure generating means.

9. The apparatus of claim 8 in which said range ring generating means comprises
range value means for providing a binary digital range signal representative of the range of said range ring, and
decoding means responsive to said binary digital range signal for providing said parallel digital bit signals in accordance therewith,
thereby intensifying said display face at the quantized range location in accordance with said binary digital range signal for writing said range ring.

10. The apparatus of claim 9 in which said radar system includes radar antenna means scannable in azimuth and in which said beam deflection means comprises means for causing the cathode ray tube beam to effect radially directed range sweeps in synchronism with transmissions of said radar system at angular orientations in synchronism with antenna azimuth, said apparatus further including converter means responsive to said antenna means for providing a binary digital azimuth signal in accordance with said antenna azimuth.

11. The apparatus of claim 10 further including dashed line control means responsive to said binary digital azimuth signal for alternately enabling and disabling the application of said serially applied bit signals to said video input whereby to write said range ring with a dashed line.

12. The apparatus of claim 11 in which said dashed line control means comprises gating means coupled between said parallel-to-serial converter means and said video input and responsive to a predetermined bit of said binary digital azimuth signal for alternately transmitting and blocking said bit signals to said video input in accordance with said predetermined bit of said binary digital azimuth signal whereby to write said range ring with a dashed line having a resolution in accordance with said predetermined bit of said binary digital azimuth signal.

13. The apparatus of claim 10 in which said azimuth geometric figure comprises two concentric arcuate lines drawn respectively above and below the range of said range ring to define an acquisition area on said display face, and in which said azimuth geometric figure generating means comprises
means for incrementing and decrementing said binary digital range signal by a predetermined value for providing respective incremented and decremented binary digital range signals for generating said two arcuate lines respectively, and
decoding means responsive to said incremented and decremented binary digital range signals for providing said parallel digital bit signals in accordance therewith,
thereby intensifying said display face at the quantized range locations in accordance with said incremented and decremented binary digital range signals for writing said two arcuate lines.

14. The apparatus of claim 13 in which said azimuth geometric figure generating means further comprises
azimuth value means for providing a further binary digital azimuth signal representative of the azimuthal location on said display face at which said azimuth geometric figure is to be written, and
comparator means responsive to said binary digital azimuth signal and said further binary digital azimuth signal for providing a comparison signal in accordance with equality therebetween,
said comparison signal being coupled for selectively enabling utilization of said binary digital range signal or of said incremented and decremented binary digital range signals in writing said acquisition marker thereby positioning said azimuth geometric figure in azimuth in accordance with said further binary digital azimuth signal.

15. The apparatus of claim 14 in which said azimuth geometric figure generating means includes azimuth switch means for altering the value of said further binary digital azimuth signal thereby changing the azimuthal location on said display face of said azimuth geometric figure.

16. The apparatus of claim 15 in which said azimuth value means comprises up/down counter means for incrementing and decrementing said further binary digital azimuth signal in accordance with manipulations of said azimuth switch means thereby controlling the azimuthal location on said display face of said azimuth geometric figure.

17. The apparatus of claim 16 further including keyboard means for inserting a keyboard binary digital azimuth signal into said up/down counter means for positioning said azimuth geometric figure on said display face in accordance with said keyboard binary digital azimuth signal.

18. The apparatus of claim 14 in which said azimuth geometric figure generating means includes timing means responsive to said comparison signal for terminating the writing of said two arcuate lines at a predetermined time after the occurrence of said comparison signal thereby controlling the length of said azimuth geometric figure.

19. The apparatus of claim 18 in which said timing means comprises counter means started by said comparison signal for providing an azimuth geometric figure termination signal at a predetermined time after the occurrence of said comparison signal for disabling said incremented and decremented binary digital range signals and enabling said binary digital range signal, thereby terminating writing of said azimuth geometric figure.

20. The apparatus of claim 9 in which said range ring generating means includes range switch means for altering the value of said binary digital range signal thereby changing the range of said range ring.

21. The apparatus of claim 20 in which said range value means comprises up/down counter means for incrementing and decrementing said binary digital range signal in accordance with manipulations of said range switch means thereby controlling the range of said range ring.

22. The apparatus of claim 20 in which said range value means comprises add/subtract accumulator means for incrementing and decrementing said binary digital range signal in accordance with manipulations of said range switch means thereby controlling the range of said range ring.

23. The apparatus of claim 22 in which said acquisition marker generating means further includes range ring motion control means responsive to said range switch means and including said accumulator means for controlling said range ring to execute an incremental change in range, to thereafter hesitate and then to move continuously in range at a rate that increases with time upon actuation of said range switch means.

24. The apparatus of claim 23 in which said range ring motion control means comprises means responsive to said range switch means for altering said binary digital range signal stored in said accumulator means by a predetermined incremental value upon initial actuation of said range switch means, hesitation timer means responsive to said range switch means for providing a start motion signal a predetermined time interval after initial actuation of said range switch means, and proportional counter means responsive to said start motion signal for providing a proportional count signal that begins increasing in value upon the occurrence of said start motion signal, said proportional count signal being applied as an input to said accumulator means for accumulation therein in an additive or subtractive manner in accordance with the actuation of said range switch means, thereby altering the value of said binary digital range signal at a rate that increases with time.

25. The apparatus of claim 1 in which said radar system includes radar antenna means scannable in azimuth and in which said beam deflection means comprises means for causing the cathode ray tube beam to effect radially directed range sweeps in synchronism with transmissions of said radar system at angular orientations in synchronism with antenna azimuth, said apparatus further including converter means responsive to said antenna means for providing a binary digital azimuth signal in accordance with said antenna azimuth.

26. The apparatus of claim 25 in which said symbology data generating means includes symbol generating means for generating said parallel digital bit signals in accordance with symbols and characters to be written on said display face at predetermined azimuth and range coordinates thereof, said display face being considered divided into a predetermined number of display face sectors in accordance with symbol orientation proper for readability.

27. The apparatus of claim 26 in which said symbol generating means comprises addressable symbol memory means comprising a predetermined number of sections corresponding to said display face sectors respectively, each said section of said memory means storing binary digital words corresponding to the symbols and characters to be written on said display face in the associated sector thereof in the proper orientation for readability in said associated sector, each said symbol and character stored in said memory means being considered defined within a plurality of incremental azimuth sectors and a plurality of quantized range bins, each said symbol and character being stored in said memory means as a plurality of binary digital words corresponding to said plurality of incremental azimuth sectors respectively, each said word storing a bit pattern corresponding to intensification required in said plurality of range bins along the associated incremental azimuth sector for writing the associated symbol, means for providing a character address signal in accordance with a selected symbol to be written on said display face, means responsive to said binary digital azimuth signal from said converter means for providing a display face sector address signal in accordance with said display face sector in which said range sweeps are being generated, addressing means responsive to said character address signal and said display face sector address signal for addressing said plurality of words storing said selected symbol designated by said character address signal in said section of said memory means designated by said display face sector address signal, and output means for applying said addressed words to said parallel-to-serial converter means for writing said selected symbol on said display face.

28. The apparatus of claim 27 in which said converter means provides an incremental azimuth sector clock signal in accordance with the incremental azimuth sectors scanned by said antenna means and in which said symbol generating means further includes address counter means responsive to said incremental azimuth sector clock signal for providing sequential address signals corresponding to sequential incremental azimuth sectors scanned by said antenna means, said addressing means being responsive to said sequential address signals for sequentially addressing said memory means to provide said plurality of words corresponding to said selected symbol to said output means, thereby writing said selected symbol on said display face.

29. The apparatus of claim 28 in which said symbol generating means further includes means for providing an azimuth coordinate signal representative of said azimuth coordinate at which said selected symbol is to be written, gating means coupled between said converter means and said address counter means for controllably gating said incremental azimuth sector clock signal to said address counter means, comparator means responsive to said azimuth coordinate signal and to said binary digital azimuth signal from said converter means for providing a comparison signal in accordance with equality therebetween, said comparison signal being coupled to said gating means for enabling said gating means when said binary digital azimuth signal is equal to said azimuth coordinate signal, thereby writing said selected character on said display face at said azimuth coordinate.

30. The apparatus of claim 29 in which said symbol generating means further comprises means for providing a range coordinate signal representative of said range coordinate at which said selected symbol is to be written, output switching means responsive to said range coordinate signal and to addressed words from said symbol memory means for aligning said bits of said addressed words with said parallel digital bit signals in accordance with said range coordinate signal for application to said parallel-to-serial converter means, thereby writing said selected character on said display face at said range coordinate.

31. The apparatus of claim 30 in which said symbol generating means further includes symbol dimension control means responsive to said binary digital azimuth signal for resetting said address counter and disabling said gating means when said address counter attains a predetermined counts selected by said binary digital azimuth signal in accordance with said display face sector, thereby controlling the azimuth dimension of said symbol in accordance with said display face sector in which said symbol is being written.

32. The apparatus of claim 31 in which said symbol dimension control means comprises switching means responsive to said binary digital azimuth signal for providing a selected one of a plurality of predetermined count signals in accordance with said display face sector, and second comparator means responsive to said selected predetermined count signal and the output of said address counter means for providing a second comparison signal in accordance with the equality therebetween, said second comparison signal being coupled to reset said address counter means and disable said gating means, thereby controlling said azimuth dimension in accordance with said display face sector.

33. The apparatus of claim 30 in which said symbol generating means further includes symbol size control means for increasing the size of a symbol when said symbol is written at less than a minimum range, thereby rendering the size of the written symbols uniform over said display face.

34. The apparatus of claim 33 in which said symbol size control means comprises frequency divider means responsive to said incremental azimuth sector clock signal for providing a further incremental azimuth sector clock signal of a frequency lower than that of said incremental azimuth sector clock signal, means for providing a minimum range signal in accordance with said minimum range, third comparator means responsive to said minimum range signal and to said range coordinate signal for providing a third comparison signal in accordance with relative magnitude therebetween, and means responsive to said incremental azimuth sector clock signal, said further incremental azimuth sector clock signal and said third comparison signal for applying said incremental azimuth sector clock signal to said address counter means when said range coordinate is greater than said minimum range and said further incremental azimuth sector clock signal when said range coordinate is less than said minimum range, thereby increasing the size of said symbols when said range coordinate is less than said minimum range.

35. The apparatus of claim 29 in which said character address signal, said display face sector address signal and said sequential address signals comprise binary digital signals and in which said addressing means includes an address adder for providing the sum of said character address signal, said display face sector address signal and each of said sequential address signals to address said symbol memory means.

36. The apparatus of claim 1 in which said symbology data generating means includes position value means for providing a binary digital position signal representative of the position of said symbology on said display face, and means responsive to said binary digital position signal for generating said data signals in accordance therewith, thereby determining the position of said symbology on said display face in accordance with said binary digital position signal.

37. The apparatus of claim 36 in which said symbology data generating means includes position switch means for altering the value of said binary digital position signal thereby changing the position of said symbology on said display face.

38. The apparatus of claim 37 in which said position value means comprises add/subtract accumulator means for incrementing and decrementing said binary digital position signal in accordance with manipulations of said position switch means thereby controlling the position of said symbology.

39. The apparatus of claim 38 in which said symbology data generating means further includes symbology motion control means responsive to said position switch means and including said accumulator means for controlling said symbology to execute an incremental change in position, to thereafter hesitate and then to move continuously in position at a rate that increases with time upon actuation of said position switch means.

40. The apparatus of claim 39 in which said symbology motion control means comprises means responsive to said position switch means for altering said binary digital position signal stored in said accumulator means by a predetermined incremental value upon initial actuation of said position switch means, hesitation timer means responsive to said position switch means for providing a start motion signal a predetermined time interval after initial actuation of said position switch means, and proportional counter means responsive to said start motion signal for providing a proportional count signal that begins increasing in value upon the occurrence of said start motion signal, said proportional count signal being applied as an input to said accumulator means for accumulation therein in an additive or subtractive manner in accordance with the actuation of said position switch means, thereby altering the value of said binary digital position signal at a rate that increases with time.

* * * * *